Oct. 22, 1957  L. G. ZESBAUGH  2,810,211
EDUCATIONAL AND AMUSEMENT TOY
Filed Nov. 19, 1953  2 Sheets-Sheet 1
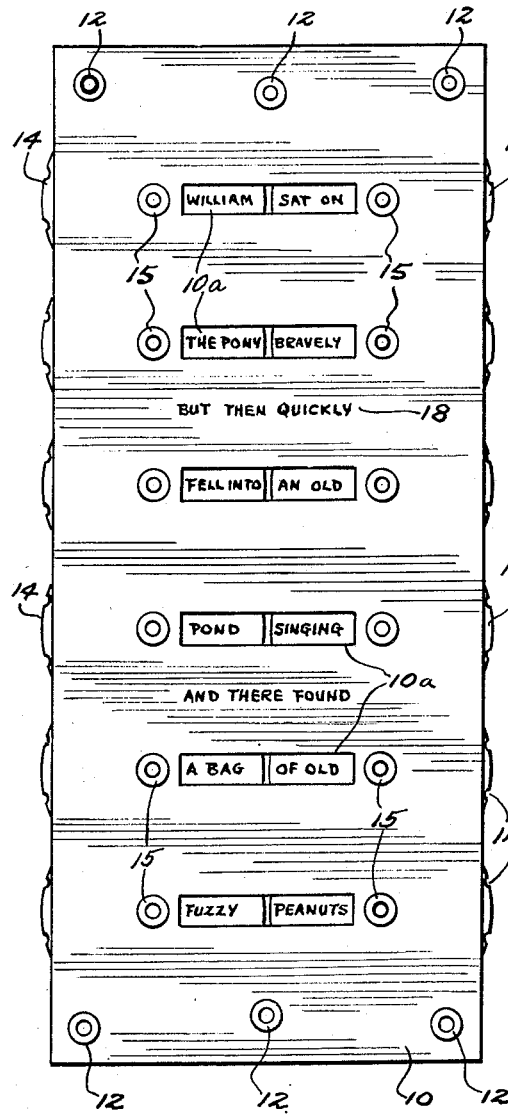
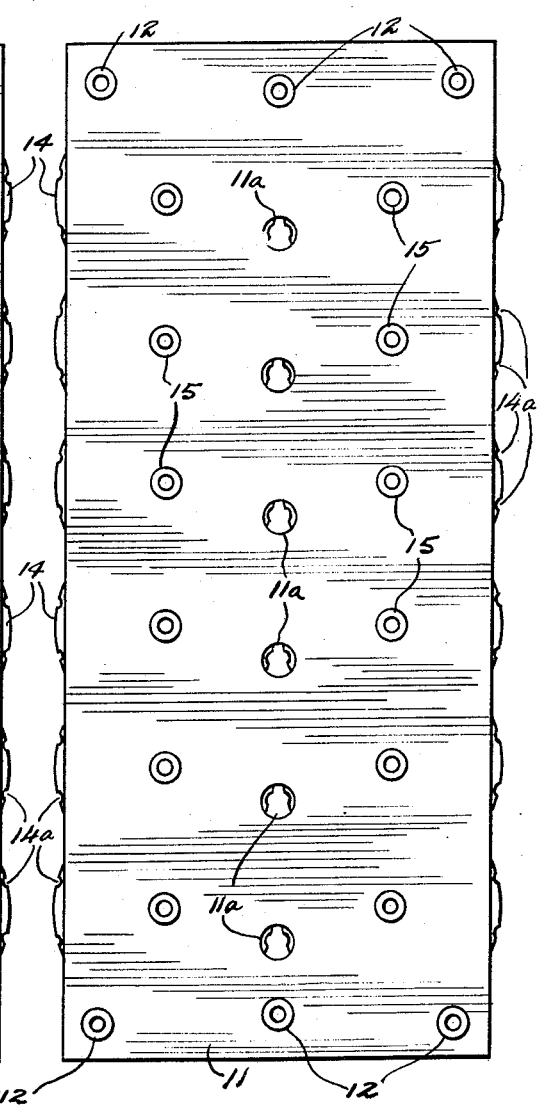
INVENTOR.
LAWRENCE G. ZESBAUGH
BY
*Chas. C. Reiff*
ATTORNEY Oct. 22, 1957        L. G. ZESBAUGH                2,810,211
                 EDUCATIONAL AND AMUSEMENT TOY
Filed Nov. 19, 1953                              2 Sheets-Sheet 2

INVENTOR.
LAWRENCE G. ZESBAUGH
BY
Chas. C. Reif
ATTORNEY

United States Patent Office 2,810,211
Patented Oct. 22, 1957

2,810,211

EDUCATIONAL AND AMUSEMENT TOY

Lawrence G. Zesbaugh, Minneapolis, Minn.

Application November 19, 1953, Serial No. 393,085

1 Claim. (Cl. 35—35)

This invention relates to a toy, and particularly to a toy having parts adapted to be moved and brought into certain positions, said parts having phrases thereon so that certain of said phrases can be brought into position to be read and form a story.

It is an object of this invention to produce an inexpensive educational and amusement device which is particularly adaptable for children learning to read. The device has separate parts with phrases thereon adapted to be positioned so that certain of the phrases can be read successively to form a story. The said stories will be grouped about one of several various environments, such as the farm, the school, the circus, the picnic, etc. The scope of the educational features extends beyond just plain spelling, reading or composition. For example, the city child will become more familiar with life on the farm as disclosed by the interesting and amusing stories which he composes from the farm group phrases. The device can also furnish interest and amusement for older folks if provided with phrases selected to suit their various interests.

It is another object of the invention to provide a device comprising transversely alined pairs of disks, said disks being mounted for rotation and having thereon spaced phrases preferably arranged in substantially radial lines. These phrases on adjacent disks are brought into alinement and read from top to bottom of the device through openings in a sheet which overlies the disks. The disks have a structure so that they can be brought into alinement from the rear of the device so that the story is formed without any forehand knowledge of the operator.

It is a further object of the invention to provide a device comprising superposed elongated sheets having mounted therebetween rotatable disks, said disks being in transversely alined pairs and the disks of the several pairs being alined in two vertical rows. The disks in the vertical rows are in overlapping relation so that the device is constructed in the most condensed form. Said disks have spaced phrases thereon which are brought into alinement and which can be read through openings in the upper sheet.

It is also an object of the invention to provide such a device as is set forth in the preceding paragraph and constructing the same so as to avoid the necessity of printing on the exposed side of the lower sheet. The disks are thus provided with structural means to indicate when the disks of each pair are in position with the phrases thereon in transverse alinement.

It is more specifically an object of this invention to provide a simple and amusing toy comprising a pair of superposed elongated pieces of stiff sheet material, a plurality of pairs of members disposed between said pieces and mounted for rotation therein, said members having phrases on their front sides, said upper piece having openings through which said phrases can be seen, said members having means thereon by which they can be rotated and located to bring said phrases into alinement.

These and other objects and advantages of the invention will be fully set forth in the following description made in connection with the accompanying drawings in which like reference characters refer to similar parts throughout the several views and in which:

Fig. 1 is a view in front elevation of the device;

Fig. 2 is a view in rear elevation of the device;

Figure 3:
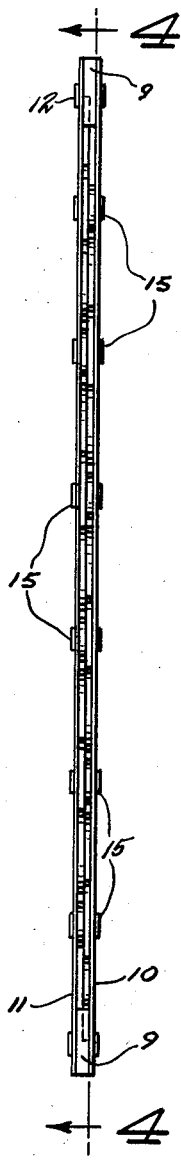
Fig. 3 is a view in side elevation or an edge view of the device.
Figure 4:
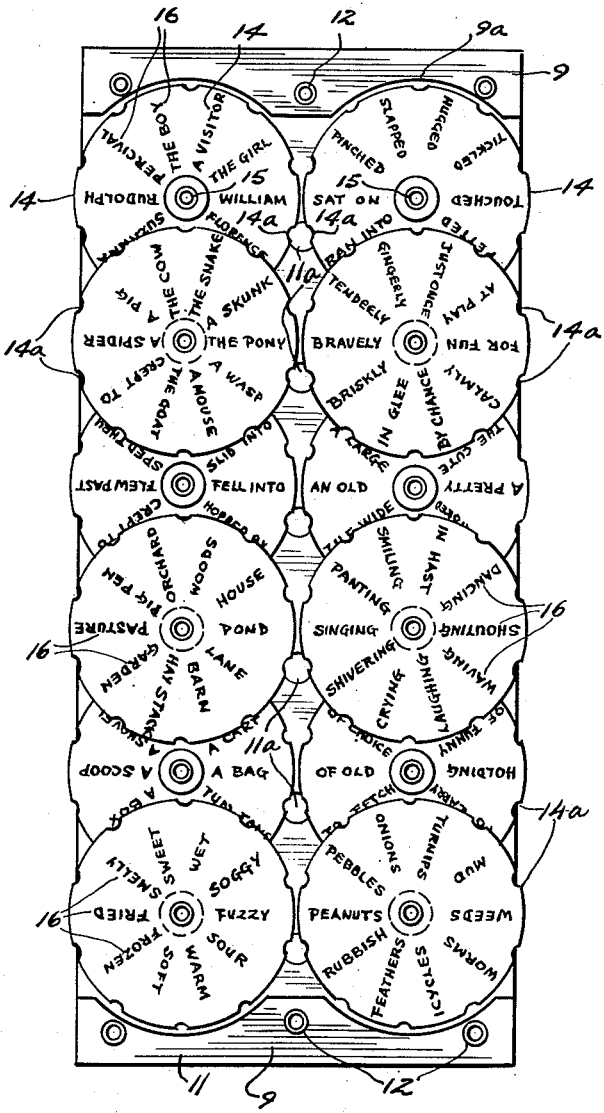
Fig. 4 is a view in front elevation with the upper sheet removed.

Referring to the drawings, a device is shown comprising a pair of superposed elongated sheets 10 and 11 of rather stiff material, such as stiff paper, cardboard, or other material such as metal. Sheets 10 and 11 are spaced somewhat and for this purpose spacing members 9 are disposed between said sheets at the top and bottom portions thereof. The outer edges of members 9 are in vertical alinement with the edges of sheets 10 and 11. While sheets 10 and 11 might take various forms, in the embodiment of the invention illustrated they are shown as of rectangular shape with said sheets in vertical alinement. Sheets 10 and 11 are secured together in any suitable manner, and in the form of the invention illustrated, said sheets and members 9 are secured by a plurality of spaced eyelets 12 disposed adjacent the top and bottom edges of said sheets. Disposed between sheets 10 and 11 is a number of disks 14. Disks 14 are mounted for rotation, and as illustrated, said disks are rotatable on eyelets or hollow rivets 15 extending through sheets 10 and 11, and said disks, and having their flanges at the outer sides of sheets 10 and 11. Disks 14 are arranged in transversely alined pairs so that the axes of each pair are in a line extending transversely of sheets 10 and 11. The corresponding disks of each pair are thus arranged in vertical rows and the axes thereof are thus in lines extending longitudinally of the sheets 10 and 11. Each disk 14 has thereon a multiplicity of spaced phrases 16. While these phrases could be variously arranged, in the embodiment of the invention illustrated they are shown as being substantially radial on their respective disks. Said disks 14 in each pair have their adjacent edges quite close together and their remote edge portions extend slightly beyond the sides of sheets 10 and 11. Each disk 14 has a multiplicity of spaced notches 14a in its periphery, which notches are the same in number as the phrases 16. The rear sheet has openings 11a therein which are disposed substantially centrally of sheet 11 and are in a row extending longitudinally of said sheet. It will be noted, as shown in Fig. 4, that the spacing members 9 are provided with semi-circular recesses 9a to accommodate the remote disks 14. The top sheet 10 is provided with openings 10a shown as of rectangular form, there being one of said openings for each pair of transversely alined disks. Openings 10a are of such size that the alined phrases on the pair of disks are seen and read therethrough. The upper sheet 10 also has phrases 18 thereon which are so selected that they will fit into the story formed by the phrases seen through openings 10a.

In operation, the operator will take the device, and looking at the rear side thereof or at the exposed side of sheet 11, he will turn the disks 14 at random and will bring a pair of the notches 14a on each transversely alined pair of disks into close position so that they are visible through openings 11a, as shown in Fig. 2. When notches 14a are thus alined or positioned, the phrases 16 on each transversely alined pair of disks come into transversely alined position so as to be visible through openings 10a, as shown in Fig. 1. When all of the disks have been so arranged, the operator will then turn the device over and look at the front side and read the story formed by the phrases 16 and 18. The disks 14 can be conveniently turned by engaging the notched edges thereof at the sides of sheets 10 and 11.

From the above description it will be seen that I have provided quite a simple structure constituting an inexpensive educational and amusement toy. The parts can be quickly formed and printed and very quickly assembled. When made from proper material the toy is very durable. It will be seen that the disks in the vertical rows are in overlapped relation which reduces the length of the device to a minimum. The transversely alined disks are quite close together, which also minimizes the width of the device. The device has been amply tested in actual practice and found to be very successful and efficient.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claim.

What is claimed is:

An educational toy comprising, in combination, a pair of elongated superposed sheet members of stiff material, a plurality of pairs of disks rotatably supported between said members, said disks being mounted for rotation on pivot elements supported by said members with the axes of each pair aligned transversely of said members, said disks having peripheral portions projecting beyond the side edges of said members and having uniformly spaced notches in said peripheral portions for manually rotating said disks, the upper member of said pair of members having a plurality of elongated openings therethrough extending transversely of said members, each opening extending over an aligned pair of disks, and radially disposed word phrases on the upper surface of said disks adapted to be exposed in transverse alignment through the openings over each pair of disks, said lower member of said pair of members having openings medially disposed between a pair of disks to expose the peripheral notched portions of said disks whereby alignment of the word phrases on a pair of aligned disks is indicated when the notches in the adjacent peripheral portions of a said pair of disks are visibly juxtaposed in a said opening in said lower member, said phrases being read from the top to the bottom pairs of disks as a story continuity.

References Cited in the file of this patent

UNITED STATES PATENTS

| | | |
|---|---|---|
| 544,907 | Braine | Aug. 20, 1895 |
| 1,019,545 | Southworth | Mar. 5, 1912 |
| 1,270,668 | Spoor et al. | June 25, 1918 |
| 1,343,112 | Charrier | June 8, 1920 |
| 1,346,929 | Zion | July 20, 1920 |
| 1,528,376 | Jerabek | Mar. 3, 1925 |
| 1,581,390 | Cook | Apr. 20, 1926 |
| 1,651,033 | McClellan et al. | Nov. 29, 1927 |
| 1,912,406 | Rudolph | June 6, 1933 |
| 1,951,022 | Iverson | Mar. 13, 1934 |
| 2,222,272 | Wesner | Nov. 19, 1940 |
| 2,312,593 | Shaw | Mar. 2, 1943 |
| 2,336,742 | Maguire | Dec. 14, 1943 |